May 26, 1970 E. R. LOHNEIS 3,513,730
INDEXING MEANS FOR MACHINE TOOL
Filed Sept. 28, 1967 3 Sheets-Sheet 1

INVENTOR.
Earl R. Lohneis
BY
Cyril M. Hajewski
ATTORNEY

May 26, 1970 E. R. LOHNEIS 3,513,730
INDEXING MEANS FOR MACHINE TOOL
Filed Sept. 28, 1967 3 Sheets-Sheet 2
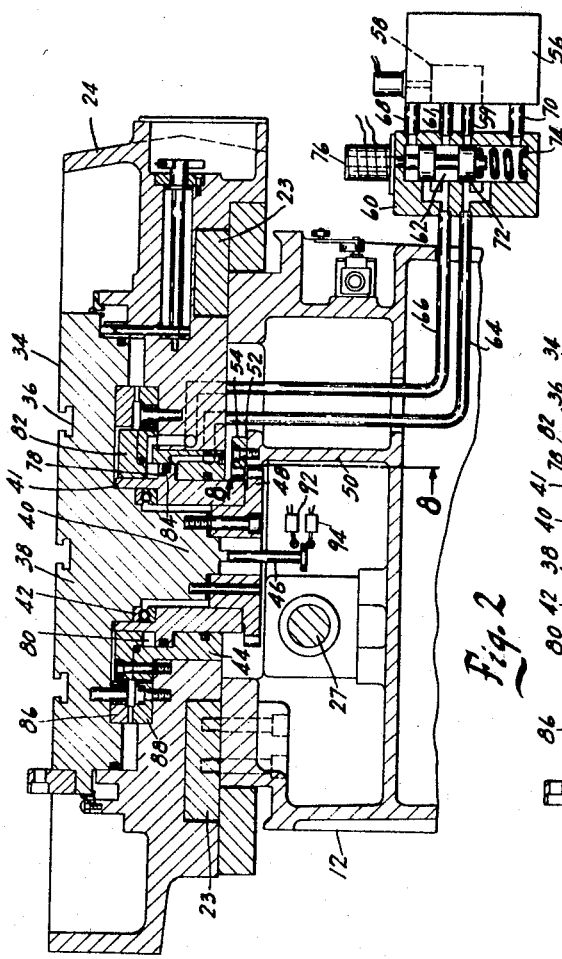
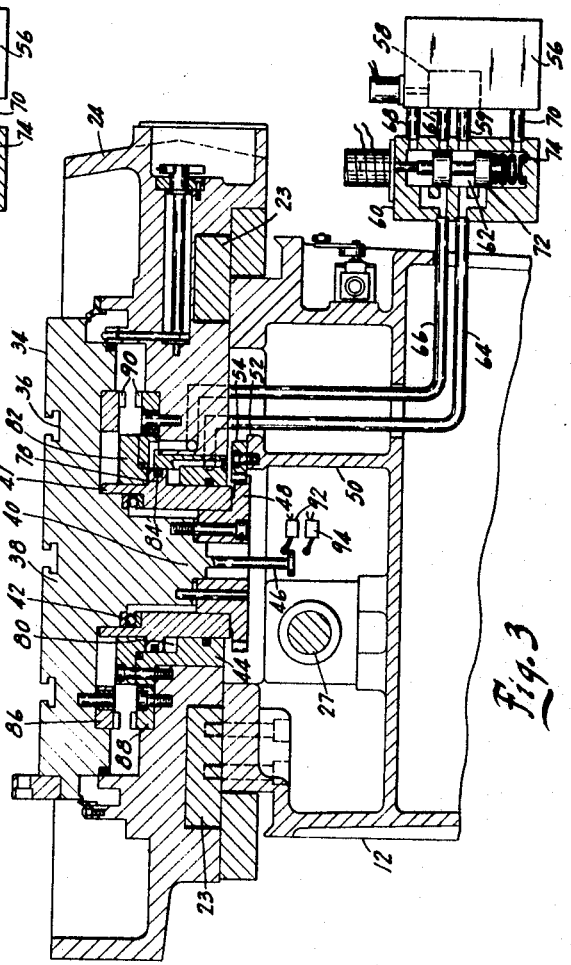
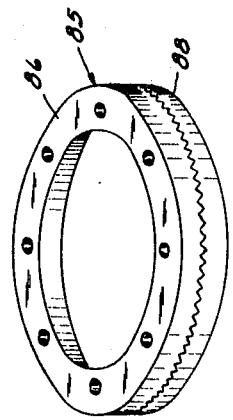
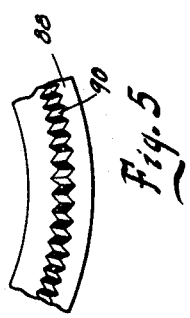
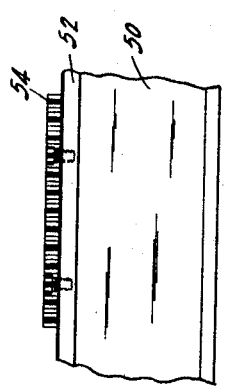
INVENTOR.
Earl R. Lohneis
BY
Cyril M. Hajewski
ATTORNEY

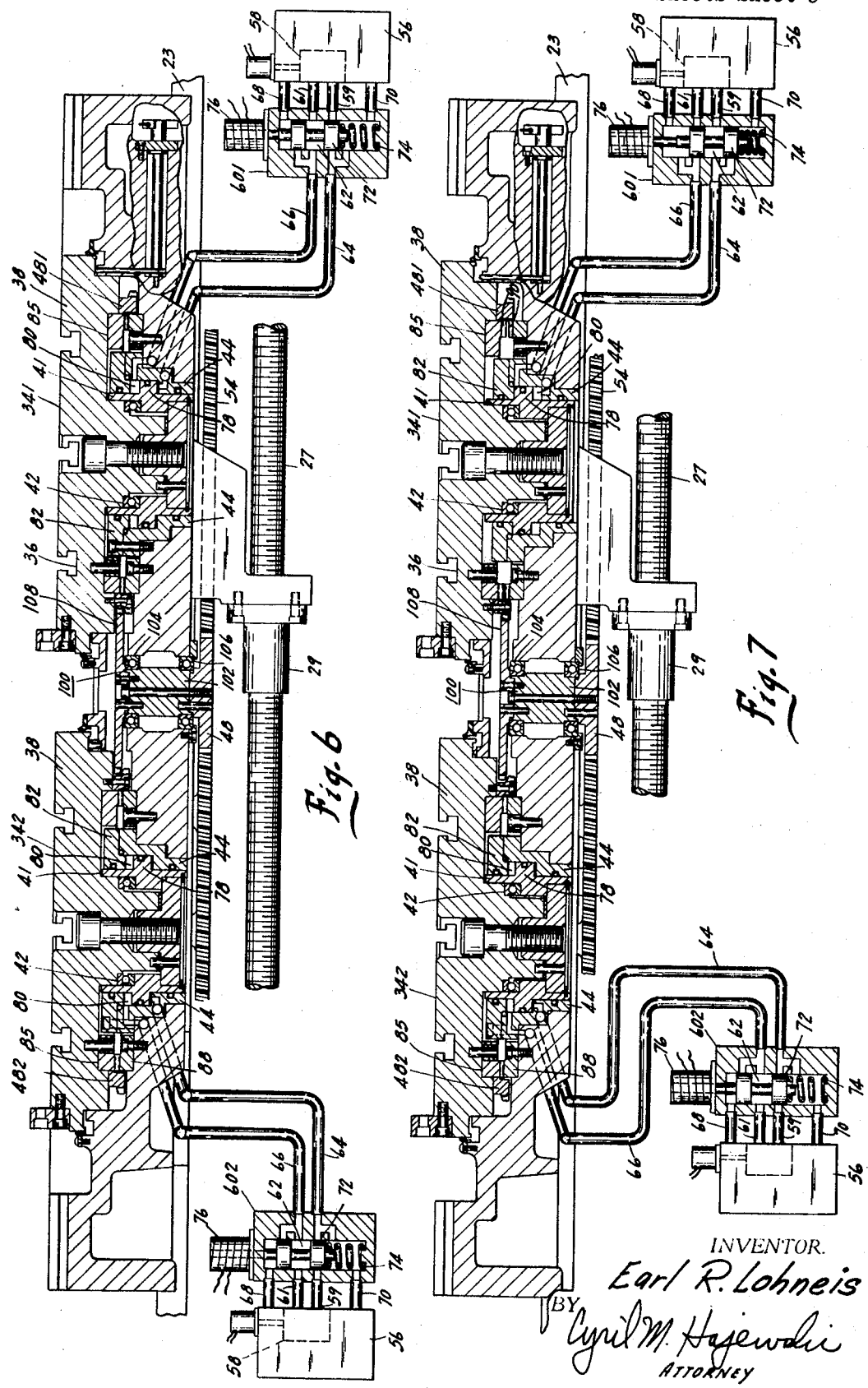

United States Patent Office 3,513,730
Patented May 26, 1970

3,513,730
INDEXING MEANS FOR MACHINE TOOL
Earl Rex Lohneis, Milwaukee, Wis., assignor to Kearney & Trecker Corporation, West Allis, Wis., a corporation of Wisconsin
Filed Sept. 28, 1967, Ser. No. 671,316
Int. Cl. B23b 39/06
U.S. Cl. 77—64     7 Claims

ABSTRACT OF THE DISCLOSURE

A means for providing arcuate motion to the index table of a machine tool. The index table is carried by a table base which is supported by, and rectilinearly movable along, the machine tool bed. A rack is mounted on the bed parallel to the direction of movement of the table base. A pinion is mounted on the index table and is selectively engageable with the rack to provide arcuate movement to the index table upon the rectilinear movemnt of the table base.

BACKGROUND OF THE INVENTION

Field of the invention

The present invention relates to machine tools and to a mechanical movement for incorporation therein.

Description of the prior art

Machine tools of the type with which the present invention may be utilized affect a relative movement between the metal working tool, such as a drill, and the work piece so that where the former and the latter come in contact, the metal working operation is performed. The work piece is generally mounted on a table base while the machine tool is mounted in a spindle head. Both the table base and spindle head are movable relative to each other. For instance, the table base and the spindle head may be movable relative to each other up and down along a vertical axis, termed the Y axis of the machine tool; back and forth along a horizontal axis perpendicular to the vertical axis, termed the X axis; and toward and away from each other along a horizontal axis perpendicular to both the preceding axes, termed the Z axis. Such relative movement of the table base and spindle head is easily obtainable by common mechanical means such as a rotatable lead screw inserted through a non-rotatable nut mounted on the machine tool element.

In numerous instances it is also desirable to provide for rotary movement of the work piece about an axis parallel to the Y axis, and perpendicular to the plane of the table base, thereby permitting, for example, a plurality of arcuately spaced holes to be drilled in the work piece. Such rotary motion is provided by including an index table in the table base which is rotatable or arcuately movable with respect to the table base. The index table is arcuately moved with respect to the table base by a separate driving means, such as an electric or hydraulic motor.

The relative movement between the spindle head and table base and the arcuate movement of the index table may be manually controlled by the machine tool operator. However, to achieve maximum utility from the machine tool, the positioning of both the metal working tool and the work piece is generally regulated by an automatic control means, such as a numerical or digital control circuit.

Such control circuits utilize pluralities of pulses to provide positioning regulation. Rotary pulse generators may be affixed to the lead screws to provide a series of pulses as the lead screws are rotated. By ascertaining the pitch of the lead screws, the amount of rectilinear movement of the machine tool elements corresponding to a given amount of rotary movement of the lead screws, as represented by a pulse total to the control means, may be easily determined. The motor arcuately moving the index table is also provided with a rotary pulse generator which regulates the movement of the index table.

In the past, the inclusion of such an index table in the table base has added greatly to the mechanical complexity and cost of the machine tool due to the necessity of providing the separate driving means for the index table in the table base and to the numerous flexible couplings, fittings, hoses, wires, and the like required to energize and control the driving mean for the index table from the stationary portions of the machine tool. The cost of the associated automatic control means has also been increased because of the additional circuitry required to regulate the arcuate movement of the index table.

Summary of the present invention

It is, therefore, the object of the present invention to provide a simple, inexpensive means for providing rotary motion to the index table of a machine tool and for regulating such motion so as to provide accurate arcuate movement or indexing of the index table. Such simplicity and lessening of expense is obtained by eliminating the separate driving means for the index table from the machine tool and the additional circuitry in the automatic control means.

Briefly, the present invention provides to a machine tool having a bed supporting a table base for rectilinear movement along the bed, the table base including at least one index table carried thereby and arcuately indexable about an axis extending through the table base, a means for indexing the index table comprising a motion translating means between the bed and index table and selectively engagable to translate rectilinear movement of the table base into arcuate motion to thereby index said table about its axis.

Brief description of the drawings

FIG. 2 is a transverse cross-sectional view of the table base and supporting bed, taken generally along the line 2—2 of FIG. 1 and showing the index table in the stationary or non-movable position;

FIG. 3 is a cross-sectional view also taken along line 2—2 of FIG. 1 showing the index table in the arcuately movable position;

FIGS. 4 and 5 are perspective and partially perspective views, respectively, of a curvic coupling employed with the index table;

FIG. 6 is a longitudinal cross-sectional view of a machine tool table base and support bed, the table base including a pair of rotatable index tables, both of the tables being in the stationary or non-movable position;

FIG. 7 is a longitudinal cross-sectional view similar to FIG. 6 showing one of the pair of index tables in the rotating or arcuately movable position, and FIG. 8 is a partial longitudinal perspective view of the embodiment of the invention shown in FIGS. 2 and 3, the plane of FIG. 8 being indicated in FIG. 2.

Description of the preferred embodiments

Figure 1:
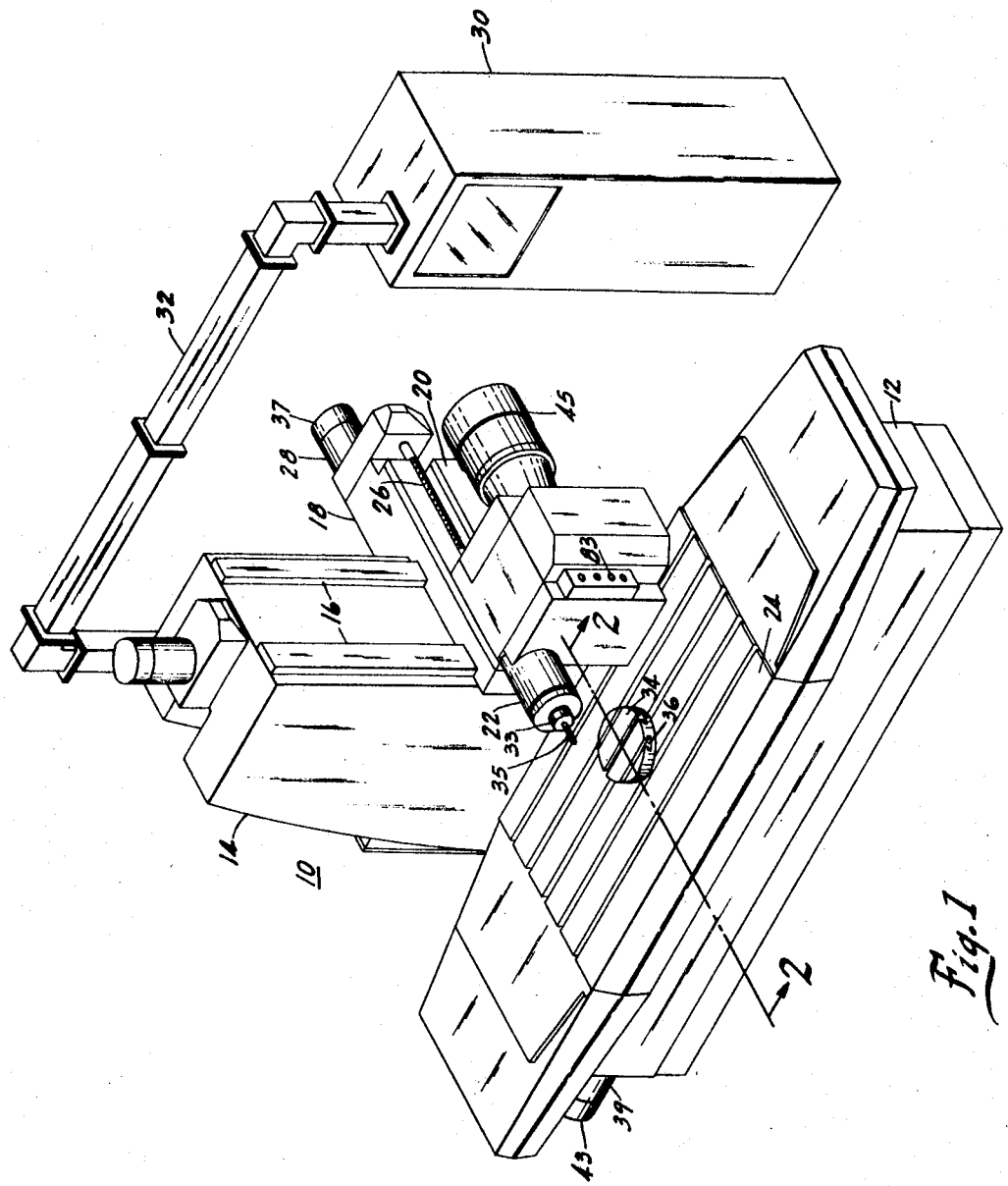
FIG. 1 is a perspective view of the machine tool having a table base including an arcuately movable index table.

Referring now to FIG. 1, there is shown therein a machine tool of the type with which the present invention may be employed. Machine tool 10 includes a bed 12 for positioning the tool on the floor of the work area. Vertical column 14 is mounted on the rear of bed 12 and contains a pair of ways 16 on which is mounted, for vertical movement up and down the column saddle 18. Such vertical movement has been termed movement along the Y axis of the machine tool. Saddle 18 includes a second set of ways 20 on which is mounted, for horizontal movement, spindle head 22. Such movement has been termed movement along the Z axis of the machine tool. Spindle head 22 contains chuck 33 in which is inserted metal working tool 35. Chuck 33 is rotated by motor 45.

Machine tool bed 12 contains a pair of longitudinal ways 23, see FIG. 2, positioned in front of column 14. Table base 24 is mounted on these ways for horizontal movement back and forth in front of column 14 and spindle head 22. Such back and forth movement has been termed to be along the X axis of the machine tool.

The movement of the elements of machine tool 10 along the axes is obtained by rotatable lead screws inserted through nuts in the elements. One such lead screw is shown in FIG. 1 and identified by the numeral 26. This lead screw engages a non-rotatable nut (not shown) in spindle head 22 and moves spindle head 22 along the Z axis of the machine tool when the former is rotated. The lead screw may be rotated by an electric motor 28. Rotary pulse generator 37, which may be of the photo-electric or electro-magnetic type, is affixed to electric motor 28 to provide a series of pulses corresponding to the rotation of electric motor 28 and lead screw 26 to automatic control means 30. Electric motor 28 and the other motors employed in machine tool 10 may be energized and regulated by automatic control means 30 connected to machine tool 10 by conduit 32.

Table base 24 includes one or more index tables 34 on which a work piece may be fastened, as by clamping means engaging T slots 36. Index table 34 is normally flush with the upper surface of table base 24 but is shown in the raised position in FIG. 1 for illustrative purposes.

The index table is arcuately movable in table base 24 about an axis extending through the table base and parallel to ways 16 and the Y axis of machine tool 10 so that the work piece may be rotated on the table base without the necessity of unclamping and reclamping the work piece to the table base. Such arcuate motion is in addition to the relative motion of table base 24 and spindle head 22.

FIG. 2 shows, in further detail, table base 24 and index table 34. Table base 24 is slidably mounted on ways 23 and moved along the ways by lead screw 27 extending through nut 29 (see also FIG. 6). Lead screw 27 is rotated by electric motor 39, shown in FIG. 1. Rotary pulse generator 43 is affixed to motor 39.

Index table 34 includes the flat disc portion 38 containing T slots 36 described above. A column 40 extends downwardly from disc 38 along the axis of rotation of index table 34. Index table 34 is journalled in a surrounding collar 41 by means of bearing 42, the races of which engage surfaces on index table 34 and collar 41. Collar 41 is, in turn, fitted in sleeve 44 of table base 24 for axial movement in the sleeve. Such axial movement permits the raising and lowering of the index table 34 with respect to table base 24.

Index table 34 is prevented from moving when in the lowered position by the locking device shown in detail in FIGS. 4 and 5. Such a device 85, often termed a curvic coupling, is formed of a pair of rings 86 and 88 having engaging teeth 90 projecting from the opposing annular planes of the rings. When the teeth 90 are engaged, as shown in FIG. 4, relative rotary motion between rings 86 and 88 is prevented. When the teeth 90 are disengaged, as by raising ring 86, relative rotation between the two rings is permitted.

Ring 86 is mounted on the underside of disc 38 of index table 34 with teeth 90 extending downwardly so as to engage the upwardly extending teeth of ring 88 mounted on table base 24.

The curvic coupling also provides a means for accurately controlling the arcuate motion of index table 34. For this purpose, the number of teeth cut in the rings correspond to the minimum indexing increment desired. For example, if it is desired to index table 34 every 5 degrees of arc, 72 teeth (5° divided into 360°) are cut into each of the rings 86 and 88. Thus teeth 90 may be fully engaged only every 5° of rotation of index table 34 and accurate indexing of the table into these 5° increments is insured.

The lower end of column 40 contains a limit switch actuator 46 which regulates the raising and lowering of index table 34 by means of limit switches 92 and 94 in a manner hereinafter described.

Index table 34 is indexed or arcuately moved by a motion translating means interposed between the machine tool bed 12 and index table 34 which eliminates the previously required separate driving means from the index table. Such a means includes a pinion gear 48 mounted on the lower end of column 40 coaxially with the axis of rotation of index table 34 so that rotation of pinion gear 48 rotates index table 34 in bearing 42.

Machine tool bed 12 is provided with a vertical flange 50 extending upwardly and terminating in a horizontal platform 52. A toothed rack 54 is secured to platform 52 so as to lie just above pinion gear 48 when index table 34 is lowered so that the upper surface of the index table is flush with the upper surface of table base 24.

While rack 54 may extend along platform 52 for the entire length of machine tool bed 12, for reasons of economy, it is presently preferred to mount rack 54 on platform 52 for only a portion of the length of bed 12, as shown in FIG. 8.

Index table 34 may be raised or lowered in table base 24 so as to selectively engage rack 54 by the hydraulic fluid means shown in FIGS. 2 and 3. Such a means includes a reservoir 56 having a motor driven hydraulic pump 58 contained therein. Hydraulic pump 58 supplies pressurized hydraulic fluid through a pair of fluid conduits 59 and 61 which are connected to solenoid operated hydraulic valve 60. Hydraulic valve 60 may be any commonly available valve and is shown in the figures as a spool valve. As such, valve 60 includes a common confined cavity 62 into which opens a plurality of inlet and outlet conduits. Fluid conduits 59 and 61 of hydraulic pump 58 open into cavity 62 in the center portion thereof. A pair of pressurized fluid outlet conduits 64 and 66 also open into cavity 62 in the central portion of the cavity. A pair of hydraulic fluid return lines, 68 and 70, located at the ends of cavity 62, also connect valve 60 to hydraulic reservoir 56.

Valve spool 72 is axially movable in cavity 62 so as to connect conduit 61 to outlet conduit 66 as shown in FIG. 2 or to connect conduit 50 to outlet conduit 64 as shown in FIG. 3. Spring 74 in the bottom of cavity 62 biases spool 72 upwardly into the position shown in FIG. 2. The actuation of solenoid 76 forces valve spool 72 downwardly into the position shown in FIG. 3.

Both outlet conduit 64 and outlet conduit 66 are connected to a hydraulic cylinder formed by collar 41 of index table 34 and sleeve 44 of table base 24. Specifically, collar 41 includes a flange 78 which mates with axial recess 80 in sleeve 44. Annulus 82 mounted on top of sleeve 44 defines the upper extremity of recess 80. A seal, such as O-ring seal 84, seals the coacting surfaces of flange 78 and recess 80.

Outlet conduit 64 opens into the lower portion of recess 80 while outlet conduit 66 opens into the upper portion of the recess.

In ordinary operation, when arcuate indexing of index table 34 is not desired, the index table remains in the lowered position and forms an integral part of table base 24. The teeth 90 of curvic coupling 85 remain engaged preventing rotation of index table 34. The work piece is mounted on the table base and/or index table and the table base, along with spindle head 22, moved along the three axes of the machine tool by rotating the lead screws to perform the machining operation. The machining operation may be controlled manually by the machine tool operator through means such as push buttons 83 or by automatic control means 30 and the rotary pulse generators.

When it is desired to index index table 34, to arcuately reposition the work piece, table base 24 is moved along ways 23 to a position wherein pinion gear 48 is located below rack 54. The positioning of table base 24 may be aided by an indicator or other means that will insure the meshing of the teeth of pinion gear 48 in rack 54 when the index table 34 and pinion gear 48 are raised.

Index table 34 is raised by energizing solenoid 76 so as to drive spool 72 downward in cavity 62 and connect outlet conduit 64 to pressurized hydraulic fluid conduit 59 allowing pressurized fluid to flow from the pump through conduit 64 into the lower portion of recess 80. The hydraulic fluid admitted to recess 80 raises flange 78 and, along with it, collar 41 and index table 34. Collar 41 slides along sleeve 44. The hydraulic fluid expelled from the upper portion of recess 80 passes through outlet conduit 66, through cavity 62 of valve 60 and conduit 68 back to hydraulic fluid reservoir 56. When index table 34 rises to a level at which the teeth of pinion gear 48 are fully engaged in the teeth of rack 54, and teeth 90 of curvic coupling 85 are disengaged, its movement is arrested by the actuation of limit switch 92 by actuator 46 mounted on the bottom of column 40. See FIG. 3.

To arcuately move index table 34, table base 24 is moved in one or the other direction along machine tool bed 12 so that pinion gear 48, by engaging stationary rack 54, is rotated by the rectilinear movement of table base 24 along ways 23 and the machine tool bed. Rotation of pinion gear 48 rotates index table 34 and the work piece attached thereto.

The amount of rotation of index table 34 depends on the amount of rectilinear movement of table base 24 and index table 34. By ascertaining the number and pitch of the teeth on pinion gear 48 and rack 54, the amount of rectilinear movement of table base 24 required for a given amount of arcuate motion of index table 34 may be easily and accurately determined. The rectilinear movement of table base 24 required to provide the arcuate movement of index table 34 may be regulated by pulse generator 43 and automatic control means 30 in the same manner as other rectilinear movements of table base 24, thereby eliminating the additional circuitry in the automatic control means previously required to regulate the arcuate movement of index table 34. As previously noted, the amount of rotation is generally divided into plurality of arcuate increments as defined by the teeth 90 of curvic coupling 85.

When index table 34 has been arcuately moved the desired amount, index table 34 is lowered into table base 24 by de-energizing solenoid 76 so as to permit spring 74 to drive spool 72 upwardly in cavity 62 so as to block outlet conduit 64 and open outlet conduit 66. This permits pressurized hydraulic fluid to flow from conduit 61, through cavity 62 of valve 60 and conduit 66, into the upper portion of recess 80 so as to lower flange 78 in the recess. The hydraulic fluid below flange 78 in recess 80 is expelled through conduit 64 and return conduit 70 to hydraulic reservoir 56.

Index table 34 is lowered into table base 24 until the teeth 90 of curvic coupling 85 engage, locking index table 34 at the desired increment of arcuate movement, and the teeth of pinion gear 48 and rack 54 disengage to prevent further rotation of the index table. Actuator 46 operates limit switch 94 to indicate when index table 34 has been lowered by this amount.

Table base 24 may then be moved along ways 23 and the X axis of machine tool 10 in the normal manner to position the work piece with respect to spindle head 22 and perform a machining operation.

FIGS. 6 and 7 show a modified embodiment of the present invention in which table base 24 contains a pair of index tables 341 and 342. The inclusion of such a pair of index tables is often desirable to permit the work piece on one of the tables to be machined while the previously machined work piece on the other index table is removed and an unmachined work piece affixed to the table. Table base 24 is then moved so that the unmachined work piece undergoes the machining operation while the machined work piece is removed. Such machine tool operation is termed shuttling. Elements common to both the embodiment of FIGS. 1 through 3 and the embodiment of FIGS. 6 and 7 are identified with similar numerals.

Referring now to FIGS. 6 and 7, it will be noted that index tables 341 and 342 include gear rings 481 and 482 mounted on the under side of discs 38 adjacent the curvic couplings 85.

Separate solenoid operated valves 601 and 602 are provided for each of index tables 341 and 342 which raise and lower the index tables in the same manner as solenoid operated valve 60 raises and lowers index table 34.

Table base 24 contains an idler pinion gear assemblage 100 journalled therein between the two index tables. The assemblage includes shaft 102 supported in the table base by bearings 104 and 106. Pinion gear 48 is mounted on the lower end of shaft 102 so as to engage rack 54 which may extend along the length of machine tool bed 12 parallel to ways 23. Spur gear 108 is mounted on the upper end of shaft 102 so as to be above gear rings 481 and 482 when tables 341 and 342 are in the lowered position.

In normal operation, when arcuate movement of index tables 341 or 342 is not desired, the index tables remain in the lowered position. Table base 24 is moved along ways 23 by rotating lead screw 27. Pinion gear 48, shaft 102, and spur gear 108 are rotated by the rectilinear movement of table base 24 and the engagement of the teeth of pinion gear 48 in rack 54. However, no rotation is provided to index table 341 or 342 because of the disengagement of spur gear 108 with gear rings 481 and 482.

To arcuately move either index table 341 or index table 342, table base 24 is stopped to stop rotation of pinion gear assemblage 100. The index table desired to be moved is raised by the actuation of the corresponding solenoid operated valve. For example, to raise index table 341, solenoid operated valve 601 is actuated to the condition illustrated in FIG. 7. The raising of index table 341 engages the teeth of gear ring 481 in the teeth of spur gear 108 and disengages the teeth 90 of curvic coupling 85. Table base is then moved in one or the other direction along ways 23 of machine tool bed 12 so as to rotate idler pinion gear assemblage 100 and index table 341 through gear ring 481. The amount, and direction, of arcuate movement of index table 341 is determined by the amount, and direction, of rectilinear movement of table base 24. When index table 341 has been rotated to the desired extent, the movement of table base 24 is stopped and solenoid operated valve 601 deenergized to lower index table 341 so as to disengage gear ring 481 and spur gear 108 and engage the teeth 90 of the curvic coupling. Table base 24 may then be moved along ways 23 and the X axis of machine tool 10 in the normal manner.

Index table 342 may be rotated in a similar manner by energizing solenoid operated valve 602. It will be appreciated that because of the position of gear ring 482 with respect to spur gear 108, the direction of rotation of index table 342 for a given direction of rectilinear movement of table base 24 will be the same as the direction of rotation of index table 341 for the same direction of linear movement of table base 24.

While the embodiments of the invention described above are, at present, thought to be preferred, it will be appreciated that modification or alteration may be made therein without departing from the spirit of the invention, and it is intended to include all such modifications or alterations as come within the scope of the claims below.

I claim:

1. In a machine tool having a bed supporting a table base for rectilinear movement along the bed, at least one index table carried by said table base and arcuately indexable about its axis, a means for indexing said index table comprising:

motion translating means located on said bed and said index table selectively engageable with each other to translate rectilinear movement of said table base into rotary motion of said index table to thereby index said table about its axis;

power drive means operably connected between said bed and said table base to effect the movement of said table base;

coupling means located between said index table and said table base and actuatable to engage said motion translating means so that rectilinear movement of said table base will produce a rotary movement of said index table with the amount of rotary movement of said index table being dependent upon the distance of rectilinear movement of said table base; and, control means connected to said power drive means to regulate the operation of said power drive means for producing a desired movement of said table base and thereby also regulating the amount of rotary movement of said index table when said motion translating means is engaged; whereby a single control means is employed for regulating both the rectilinear movement of said table base and the rotary movement of said index table.

2. Indexing means according to claim 1 wherein said motion translating means include a rack mounted on said bed parallel to the direction of rectilinear movement of said table base; and, a pinion coaxially mounted on said index table and selectively engageable with said rack.

3. Indexing means according to claim 2 wherein said coupling means is operable to effect axial movement of said index table in said table base so as to shift said index table between a position in which said rack and pinion are engaged and a position in which said rack and pinion are disengaged.

4. Indexing means according to claim 3 including a locking means located on said table base to prevent rotary motion of said index table except when said rack and pinion are engaged.

5. Indexing means according to claim 4 wherein said locking means to prevent rotary motion of said index table locks said index table in said table base in increments of arcuate displacement when said rack and pinion are disengaged.

6. Indexing means according to claim 1 wherein at least a pair of index tables are carried by said table base and arcuately indexable about their axes, said motion translating means including a rack mounted on said bed parallel to the direction of rectilinear movement of said table base;

a pinion gear assemblage journalled in said table base and engaging said rack for rotation upon the rectilinear movement of said table base, said assemblage including coaxially mounted gear; and a gearing ring mounted on each of said index tables and selectively engageable with said coaxially mounted gear.

7. Indexing means according to claim 6 including means providing relative movement between said gear rings and said coaxially mounted gear so as to shift them between a position in which said gear rings and said coaxially mounted gear are engaged and a position in which they are disengaged.

References Cited

UNITED STATES PATENTS

| 259,043 | 6/1882 | Reynolds | 90—56 XR |
| 439,134 | 10/1890 | Flanigan | 90—56 XR |
| 1,426,552 | 8/1922 | Cross. | |

FOREIGN PATENTS

| 570,201 | 2/1933 | Germany. |
| 19,452 | 1907 | Great Britain. |
| 463,204 | 3/1937 | Great Britain. |

FRANCIS S. HUSAR, Primary Examiner

U.S. Cl. X.R.

74—826